US006228905B1

(12) United States Patent
Soderberg et al.

(10) Patent No.: US 6,228,905 B1
(45) Date of Patent: May 8, 2001

(54) DROP FORMING METHOD AND SULPHUR POLYMER CONCRETE PROCESS

(75) Inventors: Allan F. Soderberg, Calgary; Paul Terness, Montrose; Derril Locke Thomas, Trail, all of (CA)

(73) Assignee: Cominco Ltd., Trail ( * ) Notice: Subject to any disclaimer, the term of this patent is extended or adjusted under 35 U.S.C. 154(b) by 0 days.

(21) Appl. No.: 09/298,609

(22) Filed: Apr. 26, 1999

(30) Foreign Application Priority Data

Oct. 15, 1998 (CA) ................................................ 2250605

(51) Int. Cl.$^7$ ........................................................ B29B 9/00
(52) U.S. Cl. ................................ 523/223; 264/7; 264/14; 528/503
(58) Field of Search ........................... 523/223; 528/503; 264/7, 14

(56) References Cited

U.S. PATENT DOCUMENTS

| | | | |
|---|---|---|---|
| 3,742,100 | * 6/1973 | Boyum | 264/14 |
| 3,933,956 | * 1/1976 | Mavrovic | 264/14 |
| 4,058,500 | 11/1977 | Vroom . | |
| 4,217,127 | * 8/1980 | Kone | 71/28 |
| 4,231,991 | * 11/1980 | Muller | 422/245 |
| 4,293,463 | 10/1981 | Vroom . | |
| 4,343,622 | * 8/1982 | Bruynseels | 23/313 |
| 5,004,799 | 4/1991 | Kohls et al. . | |

* cited by examiner

*Primary Examiner*—Paul R. Michl
(74) *Attorney, Agent, or Firm*—Elbie R. de Kock

(57) ABSTRACT

A method of transforming a molten material or melt into discrete solid particles comprises forming the melt into prills by passing the melt through a perforated member, dropping the prills onto a bed of powdered material, such as silica flour, to coat the prills with the material in the bed and permitting the prills to cool, thereby to solidify into discrete solid particles. In one embodiment, the melt comprises at least two components such as elemental sulphur and an olefinic hydrocarbon, which are subjected to a chemical reaction, such as the polymerization of the olefinic hydrocarbon with the sulphur to form a sulphur polymer stabilizer. A method of producing a sulphur concrete incorporating the sulphur polymer stabilizer is also provided.

38 Claims, 5 Drawing Sheets

DROP FORMING METHOD AND SULPHUR POLYMER CONCRETE PROCESS

FIELD OF THE INVENTION

This invention relates to a drop forming method for transforming a molten material or melt into discrete solid particles. It also relates to a method of producing a sulphur polymer stabilizer in particulate form and a method of producing a sulphur concrete.

BACKGROUND OF THE INVENTION

A sulphur concrete is a concrete mix in which sulphur is used as a binder instead of water and portland cement. Typically, a sulphur concrete comprises a mixture of sulphur with a filler material and an aggregate material. However, in order to preserve the strength characteristics of the sulphur binder it is necessary to introduce a stabilizer to prevent the transformation of monoclinic sulphur to orthorhombic sulphur and other crystallization effects. One such stabilizer comprises an olefinic hydrocarbon polymer which reacts with the sulphur to form a sulphur containing polymer, as described in U.S. Pat. Nos. 4,058,500 and 4,293,463, the entire contents of which is incorporated herein by reference.

One method of introducing the stabilizer is by reacting an olefinic hydrocarbon with elemental sulphur to produce a sulphur polymer stabilizer which is then used for producing the sulphur concrete. The stabilizer may be used immediately or at a later time.

A conventional process for producing the sulphur polymer stabilizer involves reacting the hydrocarbon with the sulphur in molten form and then pouring the resultant molten sulphur stabilizer onto a surface, allowing it to cool and solidify. Thereafter, it is broken up into pieces with machinery, such as a bobcat. The process creates a health hazard due to the dust produced. In addition, the product is subject to contamination. Furthermore, the resultant particles are inconsistent in size. This can result in a sulphur concrete mix of inconsistent quality.

It is accordingly an object of the present invention to provide a method for the production of a sulphur polymer stabilizer of improved quality with particles having a more uniform size. It is also an object of the invention to provide an improved sulphur concrete.

SUMMARY OF THE INVENTION

According to the invention there is provided a method of transforming a molten material or melt into discrete solid particles, comprising the steps of forming the melt into prills by passing the melt through a perforated member, dropping the prills onto a bed of powder material to coat the prills with the material in the bed and permitting the prills to cool, thereby to solidify into discrete solid particles.

The melt may comprise at least two components which are subjected to a chemical reaction prior to forming the melt into prills. In one embodiment, the two components comprise elemental sulphur and an olefinic hydrocarbon, the chemical reaction being the polymerization of the olefinic hydrocarbon with the sulphur to form a sulphur polymer stabilizer which constitutes the melt.

The chemical reaction may be carried out at a temperature in the range of from about 115° C. to about 150° C., preferably 140° C., and the melt may be cooled to a temperature in the range of from about 115° C. to about 125° C., preferably 120° C., prior to forming the melt into prills.

The polymerization may be permitted to proceed until the melt has a viscosity of about 30 to about 40 cp, preferably 35 cp, prior to cooling the melt for forming into prills.

The elemental sulphur and olefinic hydrocarbon may be combined at a ratio of about four parts elemental sulphur to 1 part of olefinic hydrocarbon by weight for effecting the polymerization, but other proportions are possible.

Also according to the invention there is provided a method of producing a sulphur concrete comprising the step of mixing aggregate material and filler material with elemental sulphur and a sulphur polymer stabilizer in a heated mixing vessel, wherein said stabilizer is in particulate form and prepared prior to said mixing by a method comprising the steps of subjecting elemental sulphur and an olefinic hydrocarbon to a polymerization reaction at an elevated temperature to produce a sulphur polymer in molten form, forming the molten polymer or melt into prills by passing the melt through a perforated member, dropping the prills onto a bed of powder material which is at a lower temperature than the prills to coat the prills with the material in the bed and permitting the prills to cool, thereby to solidify into discrete solid particles.

The powder material may comprise a filler material suitable for use in a sulphur concrete, such as silica flour.

Further objects and advantages of the invention will become apparent from the description of preferred embodiments of the invention below.

DETAILED DESCRIPTION OF PREFERRED EMBODIMENTS

Figure 1:
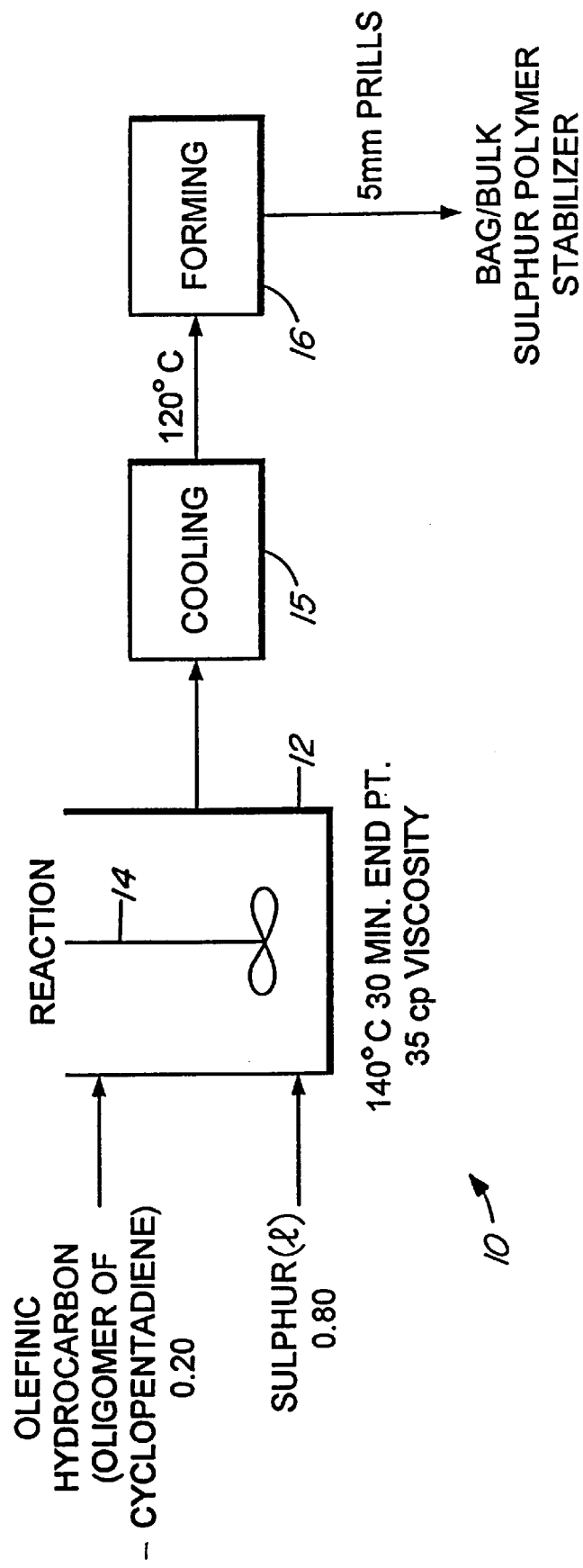
FIG. 1 is a diagrammatical representation of a process for producing a sulphur polymer stabilizer.

In FIG. 1, apparatus for producing a sulphur polymer stabilizer in particulate form is generally indicated by reference numeral 10. The apparatus 10 comprises a reaction vessel 12 provided with a stirrer 14 and drop forming apparatus 16 for transforming the stabilizer into particulate form. The reaction vessel 12 is also provided with heating and cooling means (not shown).

An olefinic hydrocarbon, such as an oligomer of cyclopentadiene, and molten elemental sulphur are introduced into the vessel 14 in a ratio of 1 to 4 by weight. The reaction which takes place in the vessel 14 is the polymerization of the olefinic hydrocarbon with sulphur. The reaction is carried out at approximately 140° C. for approximately 30 minutes. The rate of the reaction is dependent on the temperature at which the reaction is carried out. Generally, it is faster at higher temperatures. The reaction is terminated when the product has a viscosity of about 35 cp by reducing the temperature of the mixture to about 120° C. in a subsequent cooling stage 15.

It is important to rapidly cool the reaction product in order to terminate the polymerization reaction. Such cooling should be effected within 5 minutes. Such cooling can be effected by various means, such as cooling coils or a jacket vessel using cooling water. The product is then maintained at the cooled temperature until it is transformed into particulate form. Transformation of the product into particulate form should be effected within 1 hour of cooling to counteract any further reaction taking place.

Figure 2:
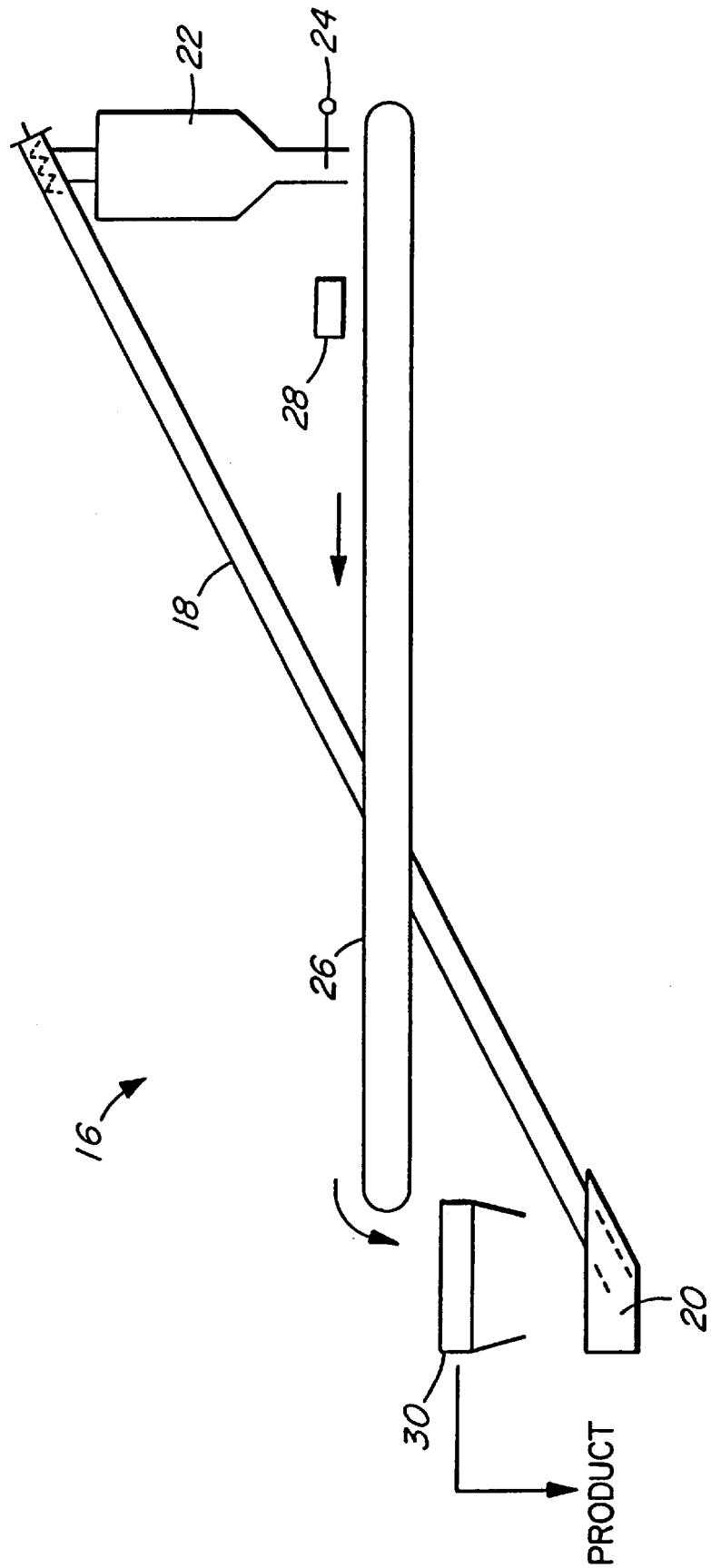
FIG. 2 is a schematical drawing showing a side view of drop forming apparatus for producing a sulphur polymer stabilizer in particulate form.

The drop forming apparatus 16 is shown in greater detail in FIG. 2. It comprises an auger 18 for transferring powder from a powder reservoir 20 to a powder distributer 22, which is in the form of a hopper provided with a sliding gate 24. The powder distributer 22 has an outlet which is positioned above a conveyor 26 which is in the form of an endless belt. In the view shown in FIG. 2, the conveyor belt is rotated counter-clockwise.

Figure 3:
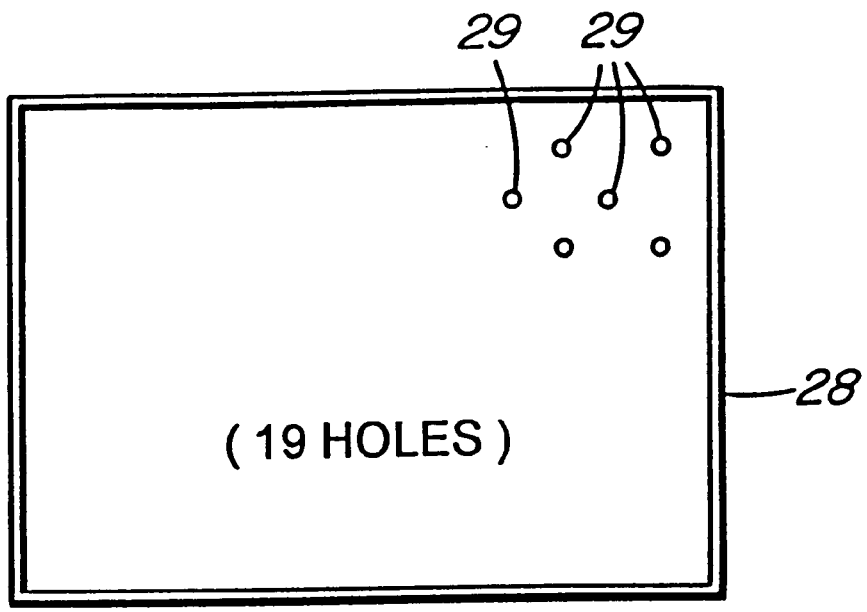
FIG. 3 is a schematical plan view of a forming tray which is part of the apparatus of FIG. 2.
Figure 4:
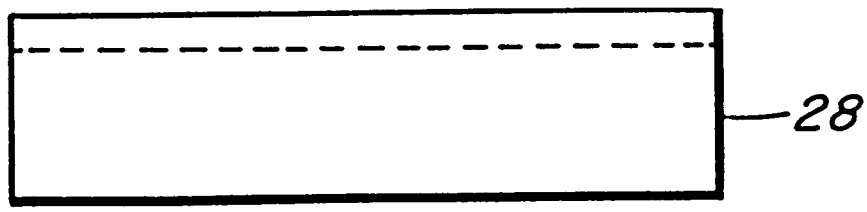
FIG. 4 is a schematical side view of the tray of FIG. 3.

The apparatus 16 also includes a drop forming tray 28 (FIGS. 3 and 4) which is located above the conveyor 26 downstream of the powder distributer 22. The tray 28 is provided with holes 29 of about 1.6 mm (0.06") spaced about 5 mm (0.2") apart, on the underside. Only some of the holes 29 are shown in FIG. 3. The perforated underside of the tray 28 is located at about 40 mm (1.6") to about 60 mm (2.4") above the conveyor 26.

The powder used in the process preferably comprises a filler material which is suitable for use in a sulphur concrete, such as silica flour of less than 200 mesh, in the present example. The powder is poured from the distributer 22 onto the conveyor 26. The outflow of powder is controlled by the gate 24 to form a bed of powder about 6 mm (0.24") to 10 mm (0.4") in depth on the conveyor 26. The powder bed is at an ambient temperature depending on the location and time of year. Typically, this may be from about 5° C. to about 25° C., but the temperature may also be outside this range. The speed of the conveyor 26 is about 0.6 m/s (2 ft/s) to about 0.8 m/s (2.6 ft/s).

The molten stabilizer product at 120° C. is transferred to the forming tray 28. In the present example the tray 28 is filled to an operating level of about 50 mm (about 2") and the molten stabilizer product is maintained at this operating level in the tray 28.

The stabilizer forms prills as the liquid stabilizer drops from the tray 28 to the powder bed on the conveyor 26. In this particular example, the prille are formed in a temperature range of about 115° C. to 120° C.

The prills cool sufficiently during the free fall to form sticky, solid particles. When these solid particles fall onto the powder bed they are coated with the powder material, preventing the prills from agglomerating into a larger sticky mass. In the present example, the resulting prills are from about 1 mm (0.04") to about 5 mm (0.2") in diameter and contain about 6.75% of the powder material, but these values may vary to suit circumstances. Prills having a 5 mm (0.2") diameter are preferred.

A vibratory screen deck 30 is located at the end of the conveyor 26 to receive the powder and coated prills dropping off from the conveyor belt 26. The coated prills are retained by the screen 30 while the powder drops into the reservoir 20 for recycle to the conveyor 26.

The resultant particulate polymer stabilizer is in a form suitable for later use. Typically, sulphur concrete is produced at a location distant from the production location of the sulphur polymer stabilizer, for economic reasons. For this reason, the particulate stabilizer is prepared for storage and transport.

A typical sulphur concrete composition is:

| Component | Weight Percent |
| --- | --- |
| Aggregate | 82.0 |
| Elemental Sulphur | 11.5 |
| Filler Material (<200 mesh) | 5.3 |
| Sulphur Polymer Stabilizer | 1.2 |

The above design mix is determined by first calculating the maximum density of the aggregate and filler and subsequent void space. The sulphur polymer stabilizer portion is typically one part sulphur polymer stabilizer to nine parts sulphur, but proportions may vary. The sulphur polymer stabilizer, sulphur and filler material are designed to fill the void space in the aggregate. The amount of filler material is typically about half of the weight of sulphur and sulphur polymer stabilizer. The composition is then varied on an iterative basis to obtain specific strength and workability for a specific application.

Sulphur concrete is produced by first selecting aggregates which are compatible with the application. For sulphur concrete, aggregates should be free of water-expansive material, compatible with sulphur and dense-graded. Sulphur required for the production of sulphur concrete can be either liquid or solid. Generally solid sulphur is easier to handle. The fine filler material should be graded to less than 200 mesh and be compatible with the environment in which the product will be used.

Figure 5:
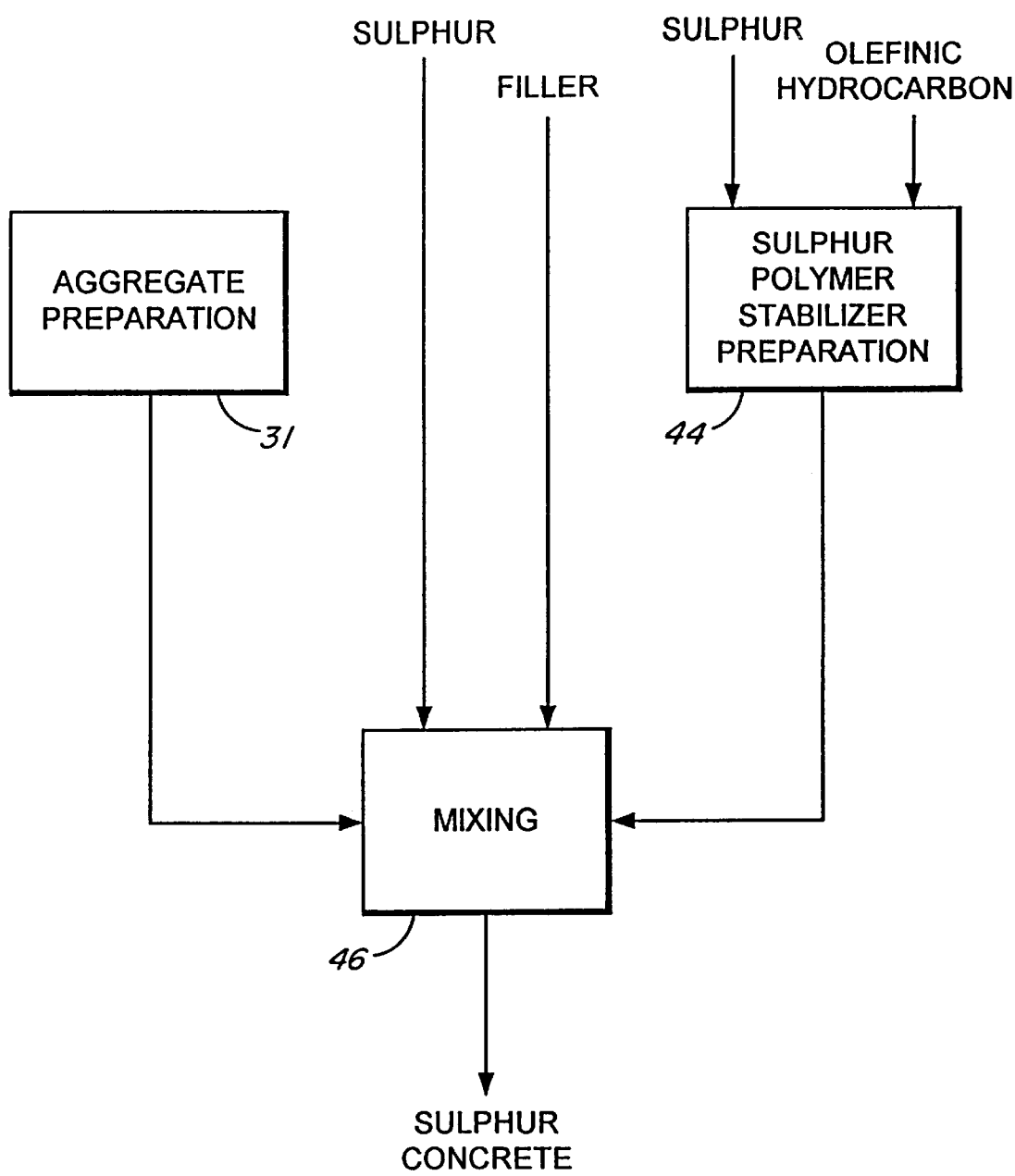
FIG. 5 is a flow diagram of a process for producing a sulphur concrete.
Figure 6:
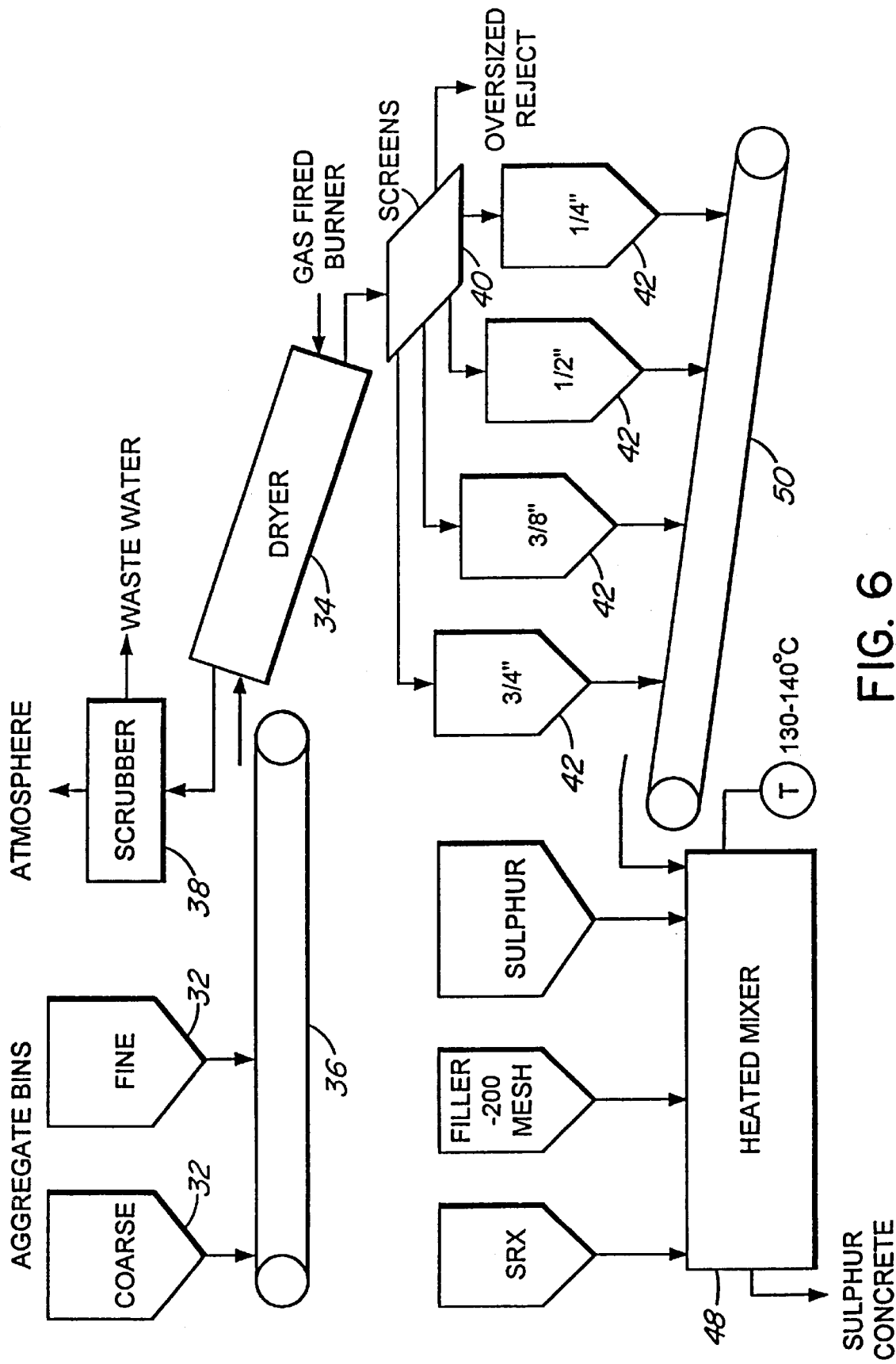
FIG. 6 is a schematical side view of apparatus for carrying out the process of FIG. 5.

A process for the production of sulphur concrete will now be described. A flow diagram of the process is shown in FIG. 5 and apparatus is shown in FIG. 6.

The aggregate is subjected to a preparation stage 31 which comprises drying and screening operations. Thus, the aggregate is dispensed from storage bins 32 and introduced into a direct fired rotary drum dryer 34 by means of a conveyor belt 36. Product gases from the dryer 34 pass via a scrubber 38 to atmosphere. The dried aggregate is screened immediately after drying by screens 40 to separate the aggregate into four size fractions which are stored in hot bins 42.

Sulphur and olefinic hydrocarbon are reacted in a preparation stage 44 to produce a sulphur polymer stabilizer. This production process has been described above with reference to FIGS. 1 and 2. The stabilizer can be produced immediately before use or ahead of time and stored until use.

The prepared aggregate, sulphur polymer stabilizer, additional sulphur and filler are then combined in a mixing stage 46.

A heated mixer 48 is used. The different sized aggregates are proportioned as required and introduced into the mixer 48 by means of a conveyor belt 50. The apparatus includes a weighing system (not shown) for effecting the proportioning.

The temperature in the mixer 48 is controlled in a range of 150° C. to 160° C.

The sulphur polymer stabilizer, filler and additional sulphur are introduced separately into the mixer 48, as shown in FIG. 6.

The temperature in the mixer 48 is approximately 150° C. when the additional sulphur is molten and approximately 160° when using solid sulphur. The elemental sulphur (solid or molten) is added to the mixer 48, followed by the filler material, and the temperature controlled to a range of 130–140° C. The sulphur polymer stabilizer is then added and thoroughly mixed in the temperature range from 130–140° C. The sulphur concrete is then placed according to the application, typically within one hour.

While only preferred embodiments of the invention have been described herein in detail, the invention is not limited thereby and modifications can be made within the scope of the attached claims.

What is claimed is:

1. A method of transforming a molten material or melt into discrete solid particles, comprising the steps of:
    forming the melt into prills by passing the melt through a perforated member;
    dropping the prills onto a bed of powder material to coat the prills with the material in the bed; and
    permitting the prills to cool, thereby to solidify into discrete solid particles.

2. The method according to claim 1, further comprising the step of imparting relative movement between the perforated member and the bed, transversely of the perforated member.

3. The method according to claim 2, wherein said relative movement is imparted in a substantially horizontal direction.

4. The method according to claim 3, wherein the bed of powder material is moved in a substantially horizontal direction during said dropping of the prills onto the bed.

5. The method according to claim 4, wherein said movement of the bed of powder material in a substantially horizontal direction is provided by discharging the powder material onto a moving endless conveyor belt.

6. The method according to claim 5, wherein the conveyor belt is substantially horizontally disposed with a front end and a rear end, the rear end being downstream of the front end in the direction of movement of the belt and wherein the powder material is continuously discharged onto the belt at a first location at the front end of the belt to form a layer of the powder material on the belt, and wherein the prills are dropped onto the belt at a second location downstream of the first location.

7. The method according to claim 6, further comprising the step of discharging the coated solid particles from the bed of powder material by permitting the particles and the powder material to fall from the belt at the rear end thereof.

8. The method according to claim 7, further comprising the step of screening the particles and the powder material falling from the belt to separate the powder material from the particles and recycling the powder material to said first location at the front end of the belt.

9. The method according to claim 1, wherein the powder material comprises a mineral powder.

10. The method according to claim 9, wherein the mineral powder comprises silica powder.

11. The method according to claim 1, wherein the powder material comprises fly ash.

12. The method according to claim 1, wherein the powder material comprises a filler material which is suitable for use in a sulphur concrete mix.

13. The method according to claim 1, wherein the bed of powder material is at a lower temperature than the prills dropping onto the bed.

14. The method according to claim 1, wherein the melt comprises at least two components which are subjected to a chemical reaction prior to forming the melt into prills.

15. The method according to claim 14, wherein said two components comprise elemental sulphur and an olefinic hydrocarbon and wherein the chemical reaction is the polymerization of the olefinic hydrocarbon with the sulphur to form a sulphur polymer stabilizer which constitutes the melt.

16. The method according to claim 15, wherein said chemical reaction is carried out at an elevated temperature and further comprising the step of cooling the melt to substantially terminate the reaction prior to forming the melt into prills.

17. The method according to claim 16, wherein the chemical reaction is carried out at a temperature in the range of from about 115° C. to about 150° C. and the melt is cooled to a temperature in the range of from about 115° C. to about 125° C. prior to forming the melt into prills.

18. The method according to claim 17, wherein the chemical reaction is carried out at a temperature of about 140° C.

19. The method according to claim 17, wherein the melt is cooled to a temperature of about 120° C. prior to forming the melt into prills.

20. The method according to claim 17, wherein said cooling of the melt is effected in a time period of no longer than about 5 minutes.

21. The method according to claim 17, wherein the polymerization is permitted to proceed until the melt has a viscosity of about 30 to about 40 cp prior to cooling the melt for forming into prills.

22. The method according to claim 17, wherein the temperature of the bed of powder material is in the range of from about 5° C. to about 25° C.

23. The method according to claim 15, wherein the elemental sulphur and the olefinic hydrocarbon are combined in a ratio of about four parts elemental sulphur to one part of olefinic hydrocarbon, by weight, for effecting the polymerization.

24. The method according to claim 15, wherein the olefinic hydrocarbon comprises an oligomer of cyclopentadiene.

25. The method according to claim 15, wherein the prills have a diameter of from about 1 mm to about 5 mm.

26. A method of producing a sulphur concrete comprising the step of mixing aggregate material and filler material with elemental sulphur and a sulphur polymer stabilizer in a heated mixing vessel, wherein said stabilizer is in particulate form and prepared prior to said mixing by a method comprising the steps of:
    subjecting elemental sulphur and an olefinic hydrocarbon to a polymerization reaction at an elevated temperature to produce a sulphur polymer in molten form;
    forming the molten polymer or melt into prills by passing the melt through a perforated member;
    dropping the prills onto a bed of powder material which is at a lower temperature than the prills, to coat the prills with the material in the bed; and
    permitting the prills to cool, thereby to solidify into discrete solid particles.

27. The method according to claim 26, wherein the powder material comprises a filler material suitable for use in a sulphur concrete.

28. The method according to claim 26, wherein the polymerization reaction is carried out at a temperature in the range of from about 115° C. to about 150° C. and the melt is cooled to a temperature in the range of from about 115° C. to about 125° C. prior to forming the melt into prills.

29. The method according to claim 28, wherein the polymerization reaction is carried out at a temperature of about 140° C.

30. The method according to claim 28, wherein the melt is cooled to a temperature of about 120° C. prior to forming the melt into prills.

31. The method according to claim 28, wherein said cooling of the melt is effected in a time period of no longer than about 5 minutes.

32. The method according to claim 28, wherein the polymerization is permitted to proceed until the melt has a viscosity of about 30 to about 40 cp prior to cooling the melt for forming into prills.

33. The method according to claim 28, wherein the temperature of the bed of powder material is in the range of from about 5° C. to about 25° C.

34. The method according to claim 32, wherein the prills are dropped through a distance of about 40 mm to about 60 mm onto the bed.

35. The method according to claim 26, wherein the elemental sulphur and the olefinic hydrocarbon are combined in a ratio of about four parts of elemental sulphur to one part of olefinic hydrocarbon, by weight, for effecting the polymerization.

36. The method according to claim 35, wherein the olefinic hydrocarbon comprises an oligomer of cyclopentadiene.

37. The method according to claim 26, wherein the aggregate material and filler material are mixed with the elemental sulphur at a temperature in the range of from about 150° C. to about 160° C. and the temperature is reduced to a range from about 130° C. to about 140° C. prior to adding the polymer stabilizer.

38. The method according to claim 26, wherein the powder material is of a size of no greater than about 200 mesh.

\* \* \* \* \*